2,829,180

CHLORINATION OF METHANE TO CHLOROFORM

Robert N. Montgomery, Baytown, Tex., and James J. Lukes, Euclid, Ohio, assignors to Diamond Alkali Company, Cleveland, Ohio, a corporation of Delaware No Drawing. Application April 30, 1954
Serial No. 426,897

8 Claims. (Cl. 260—662)

This invention relates to a method for gas-phase chlorination of methane. More particularly, the invention relates to a process in which chlorine and methane are reacted to produce a product containing a predominating proportion of chloroform.

Many disclosures appear in the art indicating that it is possible to produce chloroform by direct chlorination of methane; the difficulties which accompany the reaction are well-known. In particular, it is quite difficult to control the reaction to the end that the particular product will be obtained in quantity sufficient to warrant application of the general method, particularly as a sustained commercial operation. The reaction tends to the formation of carbon tetrachloride and unless it is controlled, this product will be produced almost to the exclusion of lower chlorinated materials.

Another difficulty which has rendered the general process unattractive is the matter of heat control in the reaction. As is well known, the reaction is highly exothermic and explosive at high chlorine concentrations, and special precautions are necessary to prevent substantial carbonization of methane and the resultant loss in yield.

Any attempt to employ direct chlorination of methane as a method of producing chloroform on a worthwhile basis must take into account and provide for both of these difficulties. It does not appear that a truly successful process has been reported in the literature since in conducting investigations leading to this invention, it has been found necessary to discard various teachings of the prior art and to supplant others in manners no way suggested by the prior art in order to arrive at the successful process hereinafter described. For example, in conducting the said investigations leading to this invention, catalytic processes suggested as being suitable for use in preparing chloroform are found to be quite unattractive, especially from the commercial standpoint, because it is impossible to direct the distribution of the final products of the chlorination reaction as fully as is desirable. In particular, it is impossible to avoid the production of a large quantity of hexachloroethane, although the product distribution as between carbon tetrachloride, chloroform, and methylene chloride may be reasonably satisfactory.

Other processes which do not involve the difficulty of excessive quantities of hexachloroethane are found at best to produce only a minor quantity of chloroform with the predominant product being carbon tetrachloride. Still other processes fail because the problem of heat control is not adequately correlated with product distribution to the end that carbonization is avoided and an overall process not involving undue difficulty in product recovery and equipment maintenance is attained.

Still other processes make poor utilization of the reactant materials in that large quantities of the chlorine and methane pass through the equipment unreacted and, accordingly, are found to be unattractive from the standpoint of yield on a single pass or once-through basis.

It is not claimed for this invention that it is the very ultimate in the process for the production of chloroform. Quite the contrary, it is to be expected that the process of this invention will be improved upon. However, it is believed unquestionably to be a process superior to any presently known process and, as measured by present standards, it is one eminently suitable for use either on a small scale or in a large commercial establishment.

Generally speaking, the process of this invention results in the production of chlorinated products containing chloroform in amounts from about 45 to 55 percent of the total chlorinated yield. In some reactions leading to these yields, chlorine and methane are found to react to the extent of 98% and 70% respectively of the original feed. Also, it has been found possible to eliminate substantially completely the formation of heavy end products, such as hexachloroethane, and to avoid substantial amounts of carbon formation.

The process of the invention does not involve expensive equipment outlays since, according to the invention, it has been found possible to control the explosive tendencies of the reaction quite simply and without the aid of special equipment.

In general, the process of this invention involves bringing together chlorine and methane in the gas phase within a reaction chamber containing a quantity of subdivided solid material, functioning as heat transfer material, in a manner such that the solid material is maintained in a state of continuous ebullient motion as the gases pass through it toward the outlet to the reaction chamber. As an aid, additional to the heat transfer material, for controlling the severity of the reaction so that it does not reach explosive proportions, and in controlling the product distribution whereby a predominant quantity of chloroform is produced, a third constituent comprising inert readily condensed and separated diluent is employed. Such diluent, preferably in liquid form as its heat absorbing capacity is thereby utilized, is introduced to the reaction zone concurrently with the introduction of chlorine and methane. During the reaction, and from its outset, the relative quantities of the three initial constituents are specifically correlated and the total feed quantity of the three constituents is related to the reactor in terms of space velocity to the end that the reacting constituent shall react as completely as possible, and at the fastest rate, with the greatest possible quantity of product resulting as chloroform, while suppressing the production of substantial quantities of the undesirable, heretofore mentioned, heavy ends.

The invention contemplates the introduction of chlorine and methane in the approximate molar ratio of 1.75–2.60 chlorine:1 methane, and preferably about 2.00–2.40:1. Concurrently therewith, the invention further contemplates the introduction of liquid carbon tetrachloride in quanttiy related to methane in the approximate molar ratio of 0.75–1.25 carbon tetrachloride:1 methane. Temperatures within the reaction zone are maintained substantially constant throughout the zone at a level between about 650° to about 775° F., preferably from about 700° to about 740° F. Gas velocities of the feed material of about 0.20 to 0.90 foot per second, preferably about 0.50 to 0.75 foot per second, are maintained, the figures referring to gas velocities of the gases above the bed of heat transfer material.

Under conditions outside of the ranges set out above, both product distribution and overall yield are impaired. Also operating difficulties are encountered that seem impossible of correction without destroying the efficiency of the process.

It is contemplated that the heat transfer material through which the reactants pass in the reaction zone may suitably be any of a large number of substances, such as pumice, kieselguhr, fuller's earth, Attapulgus clay, crushed firebrick, sand, calcined shales and finely-divided metals, such as nickel. Of this group of materials, Attapulgus clay has been found to be especially suitable in the sense that it does not appear to exert any undesirable directing influence in the reaction, and in the further sense that its heat transfer properties are in no way impaired regardless of the length of time that it is used in carrying out the reaction. While it will be recognized that the reaction may be carried out with varying degrees of success which are related to the size or form of the heat transfer material, and thus that the heat transfer material may be disposed in the reaction zone as pellets and lumps and granules of varying size, it has been found that excellent results are obtained when the heat transfer material is in relatively small particle form, for example, in particle size ranging from 100 to about 300 mesh. Smaller particle size may be employed if desired, but, in such case, provisions in addition to that ordinarily employed for the separation of fine material from the product should be employed.

Generally, it is contemplated that the heat transfer material will occupy the reaction space to the extent of about two-thirds of its volume. Further, it is contemplated that the reaction space may be in the form of an elongated vessel so that the reactant materials pass through and rapidly successively contact the large volume of heat transfer material as it proceeds toward the outlet end of the reaction chamber. It is, of course, possible to supply the reactants to a similar volume of a heat transfer material where it is disposed in a different form of reactor by introducing the reactants at a multiplicity of points in the reaction zone so as to achieve substantially the same contact effect as that in the vessel of the elongated type. Moreover, it is envisioned that in the preferred form of the present invention, the reactant materials may be introduced at a plurality of points along the length of the reaction chamber whereby improvements in reduced heat generation and in heat dissipation are accomplished.

It is desired to emphasize that the relative molar quantities of the reacting constituents, including the assisting material heretofore designated as carbon tetrachloride, and the total quantity of reacting materials as thus constituted that are supplied at gas velocities within the recommended range are extremely important considerations in the realization of the especially successful results of the process of the invention. It is also desired to emphasize that it is an especially important feature of this invention that the third constituent of the aforementioned three constituents, namely, carbon tetrachloride, is supplied to the reaction zone in the liquid phase and in its own molar ratio respecting the methane feed.

In the foregoing paragraphs, the invention has been described with considerable particularity; however, it will now be described in greater detail by setting forth exemplary runs of the process in relation to suitable apparatus and operating technique. First, a description of suitable apparatus in which the process may be carried into effect is set forth, and wherever statements are made in the examples concerning elements of apparatus, it will be understood that such statements refer to the apparatus now to be described for illustrative purposes and that other suitable apparatus may be employed.

Suitable equipment for use in carrying out the invention may comprise an elongated tubular reactor provided with one or more inlets for reactants along its length, preferably in the lower half of the reactor, and one or more outlets for products near its top. Such a reactor may be of, for example, nickel or nickel-lined steel, and, for example, in internal dimensions, may measure ten feet in length and about 2.75 inches in diameter. Preferably, fines separating means suitably, a cyclone separator, is provided through which the product gases are led for removal of any entrained particulate heat transfer material. Suitable product recovery means are provided, including such as, condensing means, a hydrogen chloride absorber, and refrigerating apparatus, all of which are well-known to the art. Suitable storage and feed metering means are provided for supplying the reactants to the point of inlet of the reactor.

More particularly in regard to the reactor, it should be provided with a heating means for use in bringing it to the desired start-up temperature. Such heating means may be, for example, a wire coil over the length of the reactor, that is, a resistance type heater under the control of a rheostat. A pair of such coils may be provided, one for each of the upper and lower sections, and operated independently for particular reasons. For example, the upper coil may be kept at a sufficiently high temperature to avoid condensation in the upper section of the reactor.

Suitable metering devices are provided in the inlet lines for controlling the quantities of the reactants and the reactor is provided with a temperature recorder in order that the temperature in the reactor may be observed as the reaction proceeds, and, if necessary, controlled so as to keep the reaction within the preferred temperature limits. As indicated previously herein, the reaction chamber should contain a finely-divided heat transfer material, such a material suitably being a finely-divided clay, for example, Attapulgus clay, to a depth of about 3 to 4 feet.

In delivering the reactants to the reaction chamber, the separate chlorine, methane and carbon tetrachloride lines may be arranged to deliver to a common inlet line whereby the three materials enter the reactor simultaneously. Suitably, the chlorine and methane lines may enter the main feed line at a point ahead of the carbon tetrachloride line so as to sweep the liquid carbon tetrachloride in, steadily and continuously.

Prior to putting the process on full stream, some preparatory steps may advantageously be taken. These may comprise, for example, first heating the reactor to between 600–700° F. by means of the resistance heater and with the bed at this temperature level, next feeding in methane for a period of about 5 minutes so as to sweep the reactor free of extraneous gases. Then, and in concurrence with further quantities of methane, carbon tetrachloride may be introduced for a short time and, finally, chlorine may be introduced to the feed line. Desirably, at this point, the chlorine feed rate is considerably lower than the final desired rate, as well as are the methane and carbon tetrachloride feed rates. The temperature in the reactor may then be brought slowly to the preferred operating range, for example, about 735–740° F., during which time the methane and carbon tetrachloride feed rates may be increased gradually to the desired operating points and there maintained. Finally, the chlorine flow is brought up gradually while, at the same time, lowering the heat supplied externally until a good balance between the heat supplied externally, the heat lost throughout the system, and the heat supplied by the reaction is reached. Thereafter, where using a small reactor as described herein, it is necessary only to make small adjustments of the external heater to maintain the bed temperature within a few degrees of the desired operating temperature.

As is well-known, the reaction is highly exothermic and, therefore, it is contemplated that some installations may require a suitable means for cooling the reactor. For example, a reactor of 6 feet in diameter should be provided with external cooling means in order to best fit it for the full operating ranges contemplated by the invention.

During the start-up procedure, of course, the product recovery equipment has been placed in readiness for receiving the products.

The following examples are now offered:

*Example 1*

Having placed the equipment in readiness for full stream feed as described above, chlorine, methane, and carbon tetrachloride are fed to the reaction zone under conditions providing a gas velocity of about 0.20 foot per second. About 4.03 g. moles per hour of methane are in the entering gases while chlorine and carbon tetrachloride are supplied on the basis of 2.1 moles of chlorine:1 mole of methane, and 1 mole of carbon tetrachloride:1 mole of methane, respectively. Bed temperature within the reactor is held constant at about 740° F. Sample products are collected and analyzed at intervals. It is found that chlorine is continuously reacting at 100 percent of its original feed and methane is reacting at 60 percent of its original feed. Total chlorinated products weight is 311.8 g. per hour, of which 44.4 percent by weight is chloroform, 37.2 percent by weight is carbon tetrachloride. 18.3 percent by weight comprises the lighter ends, and only 0.15 percent by weight of heavy ends, including hexachloroethane, are produced.

Increasing the molar ratio of chlorine to methane to 2.6:1 in this exemplary run results in an increase in utilization of methane to about 75.1 percent of the original feed. However, chloroform production is reduced to about 42.0 percent by weight and carbon tetrachloride production increases to about 47.4 percent by weight of the products produced. The heavy ends that are formed remains about the same at 0.20 percent by weight of the product.

*Example II*

Chlorine in the ratio of 1.86:1 methane, carbon tetrachloride in the molar range of 1:1 methane and 12.87 g. moles per hour of methane are passed through the reactor at a gas velocity of 0.57 foot per second. The temperature of the bed is about 740° F. The chlorinated products comprise 46.8 percent chloroform, 33.6 percent carbon tetrachloride, 19.4 percent lighter ends, and 0.12 percent heavy ends, all percentages being by weight of the total chlorinated material. It is found that 97.2 percent of the original chlorine feed is reacted and 57.5 percent by weight of the original feed of methane is reacted. Strikingly improved results are accomplished in this instance by increasing the chlorine to methane molar ratio to about 2.10:1. In this instance, chloroform is increased to about 52 percent by weight largely at the expense of the lighter ends, and heavy end production remains very low at 0.12 percent by weight of the chlorinated products. However, heavy end production begins to increase, although it is still tolerable since the quantities are below about 2 percent by weight of the total chlorinated products.

*Example III*

In an operation entirely similar to those of the foregoing examples, 9.85 g. moles per hour of methane are delivered to the reactor. Chlorine is fed on the basis of 2.35 moles to 1 methane and carbon tetrachloride is fed at 0.92 mole to 1 of methane. The gas velocity is about 0.65 foot per second. About 51 percent of the resulting chlorinated products is chloroform against about 33 percent carbon tetrachloride. Lighter ends constitute about 12 percent of the products and heavier ends are below 2 percent.

It will be seen from the foregoing examples, especially Examples II and III wherein the gas velocity is increased, that excellent product distribution is accomplished and that the distribution, such as is shown by these examples, fully indicates that direct chlorination of methane to produce chloroform is an entirely feasible operation. It is to be noted that the process as exemplified by the foregoing examples exhibits no significant carbonization in the reaction zone and this is conclusive upon the question of whether the reaction temperature and the explosive character of the reaction are being controlled.

Still better utilization of the invention may be realized by recycling the lighter ends produced in the process to the reaction zone. An additional aid in controlling the reaction is thereby had without disturbing the product distribution to any extent. Furthermore, better overall yields are achieved.

In describing the invention, it has been stated generally that carbon tetrachloride is fed to the reaction zone and reference has not been made to its source. It will be appreciated, of course, that carbon tetrachloride may be obtained from storage or may be supplied by recyling the product carbon tetrachloride to whatever extent is desirable.

In the foregoing description of the invention, it has been pointed out that carbon tetrachloride is supplied to the reaction zone in liquid form, and it is desired to state again that this is the preferred procedure. However, carbon tetrachloride may be supplied in the vapor state although carbonization will very likely be found to be in evidence with resultant loss of yields. It is also likely that the product distribution will be disturbed but not to the full extent that the process is rendered completely unattractive. The less desirable vapor phase feeding of carbon tetrachloride may be offset in part, however, by distributing the incoming reactants at a multiplicity of points whereby the excess heat that the reaction generates is distributed more widely throughout the reaction zone and is thereby more easily dissipated.

While the process has been described as non-catalytic, and the fluidized solids contained in the reaction zone are referred to as heat transfer material, it is to be understood that the invention extends to such catalytic materials that do not defeat the ends of the invention and which perform a corresponding or similar degree of dissipation of heat in the reaction zone.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for chlorinating methane to a preponderance of chloroform, comprising simultaneously feeding chlorine, methane and carbon tetrachloride into a body of fluidizable solids at gas velocities of between about 0.20 and about 0.90 foot per second, and maintaining the temperatures within the reaction zone between about 650° and about 775° F., the said chlorine and carbon tetrachloride in the material fed to the reaction zone being within the molar ratio with respect to methane of about 1.75–2.60:1 methane and 0.75–1.25:1 methane, respectively.

2. A process as claimed in claim 1 wherein the temperature range is about 700–740° F.

3. A process as claimed in claim 1 wherein the said gas velocity is within the range between about 0.50–0.75 foot per second.

4. A process as claimed in claim 2 wherein the said gas velocity is within the range of about 0.50–0.75 foot per second.

5. A process as claimed in claim 4 wherein the said chlorine to methane ratio is about 2.00–2.40:1.

6. A process as claimed in claim 5 wherein the said carbon tetrachloride is liquid at the time it enters the reaction zone.

7. A process as claimed in claim 6 which includes recycling to the reaction zone the lighter ends that are produced in the process.

8. A process for chlorinating methane to a preponderance of chloroform in the reaction product, comprising the steps of feeding a mixture of chlorine, methane, and liquid carbon tetrachloride to a reaction zone containing finely-divided solid material which is maintained in a state of continuous ebullient motion as the gases pass through said solid material toward the outlet to said reaction zone, the molar ratio of chlorine:methane being substantially within the range of 1.75–2.60 chlorine:1 methane, and the ratio of said carbon tetrachloride:methane being substantially within the range of 0.75–1.25 carbon tetrachloride:1 methane, maintaining the temperature within the reaction zone between about 650° and about 775° F., and recovering the products of reaction of said methane and said chlorine.

References Cited in the file of this patent

UNITED STATES PATENTS

| 2,334,033 | Riblett | Nov. 9, 1943 |
| 2,406,195 | Cass | Aug. 20, 1946 |
| 2,442,324 | Heitz et al. | May 25, 1948 |
| 2,676,998 | Kuntz et al. | Apr. 27, 1954 |